United States Patent
Sessink et al.

(10) Patent No.: US 9,608,698 B2
(45) Date of Patent: Mar. 28, 2017

(54) WIRELESS POWER AND DATA TRANSMISSION

(71) Applicant: NXP B.V., Eindhoven (NL)

(72) Inventors: Frans Sessink, Nuenen (NL); Frank Verwaal, The Hague (NL)

(73) Assignee: NXP B.V., Eindhoven (NL)

( * ) Notice: Subject to any disclaimer, the term of this patent is extended or adjusted under 35 U.S.C. 154(b) by 201 days.

(21) Appl. No.: 13/727,068

(22) Filed: Dec. 26, 2012

(65) Prior Publication Data
US 2014/0179223 A1    Jun. 26, 2014

(51) Int. Cl.
| | |
|---|---|
| *H04B 5/00* | (2006.01) |
| *G07C 9/00* | (2006.01) |
| *G06K 7/10* | (2006.01) |
| *G06K 19/07* | (2006.01) |
| *G06K 19/073* | (2006.01) |

(52) U.S. Cl.
CPC ....... H04B 5/0068 (2013.01); G06K 7/10158 (2013.01); G06K 19/0724 (2013.01); G07C 9/00309 (2013.01); H04B 5/0031 (2013.01); H04B 5/0037 (2013.01); H04B 5/0087 (2013.01); G06K 19/07318 (2013.01); G07C 2009/00603 (2013.01)

(58) Field of Classification Search
USPC .......................................... 455/41.1; 342/125
See application file for complete search history.

(56) References Cited

U.S. PATENT DOCUMENTS

| | | | | |
|---|---|---|---|---|
| 4,757,315 A | * | 7/1988 | Lichtenberg et al. | ........ 342/125 |
| 6,236,315 B1 | * | 5/2001 | Helms et al. | .............. 340/572.7 |
| 6,323,566 B1 | * | 11/2001 | Meier | ................ G07C 9/00309 180/287 |
| 6,658,328 B1 | * | 12/2003 | Alrabady | ........... G07C 9/00309 307/10.2 |
| 6,747,545 B2 | | 6/2004 | Nowottnick et al. | |

(Continued)

FOREIGN PATENT DOCUMENTS

| | | |
|---|---|---|
| EP | 0 642 092 A2 | 3/1995 |
| KR | 20070101703 A | 10/2007 |

(Continued)

OTHER PUBLICATIONS

Extended European Search Report for Patent Appln. No. 13199474.1 (Mar. 27, 2014).

*Primary Examiner* — Junpeng Chen
(74) *Attorney, Agent, or Firm* — Rajeev Madnawat

(57) ABSTRACT

Communications between a base station and a transponder that is powered by the base station are effected using a signal differentiation approach. A first radio frequency signal is communicated between the base station and the transponder to power the transponder, with the first radio frequency signal including noise and data for authenticating communications between the base station and the transponder. A second radio frequency signal is communicated between the base station and the transponder, with the second radio frequency signal including data for authenticating communications between the base station and the transponder. The detection of noise presented via the first radio frequency signal is mitigated while detecting data in the second radio frequency signal, via signal differentiation.

40 Claims, 6 Drawing Sheets

(56) References Cited

U.S. PATENT DOCUMENTS

| | | | | |
|---|---|---|---|---|
| 6,842,493 B2 * | 1/2005 | Blatz | ................... | G06K 7/0008 |
| | | | | 340/5.1 |
| 2003/0058086 A1 * | 3/2003 | Hara | ......................... | 340/425.5 |
| 2004/0075532 A1 * | 4/2004 | Ueda | ...................... | E05B 77/48 |
| | | | | 340/5.72 |
| 2005/0017073 A1 * | 1/2005 | Fernandez | ................... | 235/451 |
| 2007/0063895 A1 * | 3/2007 | August | ............... | G06K 7/0008 |
| | | | | 342/359 |
| 2008/0024322 A1 | 1/2008 | Riemschneider et al. | | |
| 2008/0169898 A1 * | 7/2008 | Kato et al. | ..................... | 340/5.1 |
| 2009/0034437 A1 * | 2/2009 | Shin | .................. | H04B 7/15585 |
| | | | | 370/278 |
| 2010/0311328 A1 | 12/2010 | Kargl et al. | | |
| 2012/0062358 A1 | 3/2012 | Nowottnick | | |
| 2012/0105219 A1 * | 5/2012 | Kofler | .................. | H04B 5/0062 |
| | | | | 340/426.16 |
| 2012/0252365 A1 * | 10/2012 | Lam | ................... | G07C 9/00309 |
| | | | | 455/41.2 |
| 2012/0280788 A1 * | 11/2012 | Nowottnick | ..... | G06K 19/07767 |
| | | | | 340/5.61 |
| 2012/0286927 A1 * | 11/2012 | Hagl | .................. | G07C 9/00309 |
| | | | | 340/5.61 |
| 2014/0051364 A1 * | 2/2014 | Simons | ............. | H04W 52/0229 |
| | | | | 455/68 |

FOREIGN PATENT DOCUMENTS

| | | |
|---|---|---|
| WO | 2004/104915 A1 | 12/2004 |
| WO | 2004/114240 A2 | 12/2004 |

\* cited by examiner

WIRELESS POWER AND DATA TRANSMISSION

Wireless communication apparatuses and systems often involve a passive component, such as a passive key that is powered by an electromagnetic field transmitted by a base station. Communication is effected between the base station and passive key to facilitate one or more operative conditions, such as for passive keyless entry (e.g., unlocking a vehicle door) or passive keyless go (e.g., activating a circuit for operating a vehicle drive system).

While such wireless communication has been useful, the implementation of these communications has been challenging. For example, the power supplied by a base station must be sufficiently large to supply an electronic circuit in a passive key transponder over a desired distance. To effect data communication, sensitivity must be adequate for the reception of what can be a weak data signal superimposed on a stronger transmitted wave and in an environment in which power is communicated via such signals. Accordingly, the respective communication of power and data may compete, particularly as signal noise can present issues when attempting to accurately communicate data. Achieving such communication can often require circuitry that is complex, expensive and bulky.

These and other matters have presented challenges to wireless communications involving power and data, for a variety of applications.

Various example embodiments are directed to communications circuits and their implementation.

According to an example embodiment, communications between a base station and a transponder powered by the base station are effected by communicating a first radio frequency signal between the base station and the transponder to power the transponder, in which the first radio frequency signal includes noise and data for authenticating communications between the base station and the transponder. A second radio frequency signal is communicated between the base station and the transponder, in which the second radio frequency signal includes data for authenticating communications between the base station and the transponder. Detection of the noise presented via the first radio frequency signal is mitigated, while detecting data in the second radio frequency signal, by signal differentiation. Such signal differentiation may include, for example, one or more of the use of separate antenna coils, frequency differentiation, phase modulation and signal subtraction/cancellation. These aspects may be implemented in one or more of method, apparatus and system-based embodiments. These aspects may also be implemented for a variety of applications, such as keyless access and keyless operation applications (e.g., for accessing a vehicle or structure, or engaging a vehicle drive system).

Another example embodiment is directed to an apparatus having first and second communication circuits and a signal differentiation circuit. The first communication circuit communicates a first radio frequency signal between a base station and a transponder to power the transponder, in which the first radio frequency signal includes noise and data for authenticating communications between the base station and the transponder. The second communication circuit communicates a second radio frequency signal between the base station and the transponder, in which the second radio frequency signal includes data for authenticating communications between the base station and the transponder. The signal differentiation circuit mitigates detection of the noise presented via the first radio frequency signal while detecting data in the second radio frequency signal via signal differentiation.

In a more particular embodiment, a system includes a base station that communicates a first radio frequency signal including power, noise and data for authenticating communications, and a transponder that receives the first radio frequency signal from the base station and uses power in the first radio frequency signal to generate and transmit a second radio frequency signal including data for authenticating communications. The base station and the transponder operate to mitigate detection of the noise presented via the first radio frequency signal via signal differentiation, while communicating data in the second radio frequency signal to the base station, thereby authenticating the transponder.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
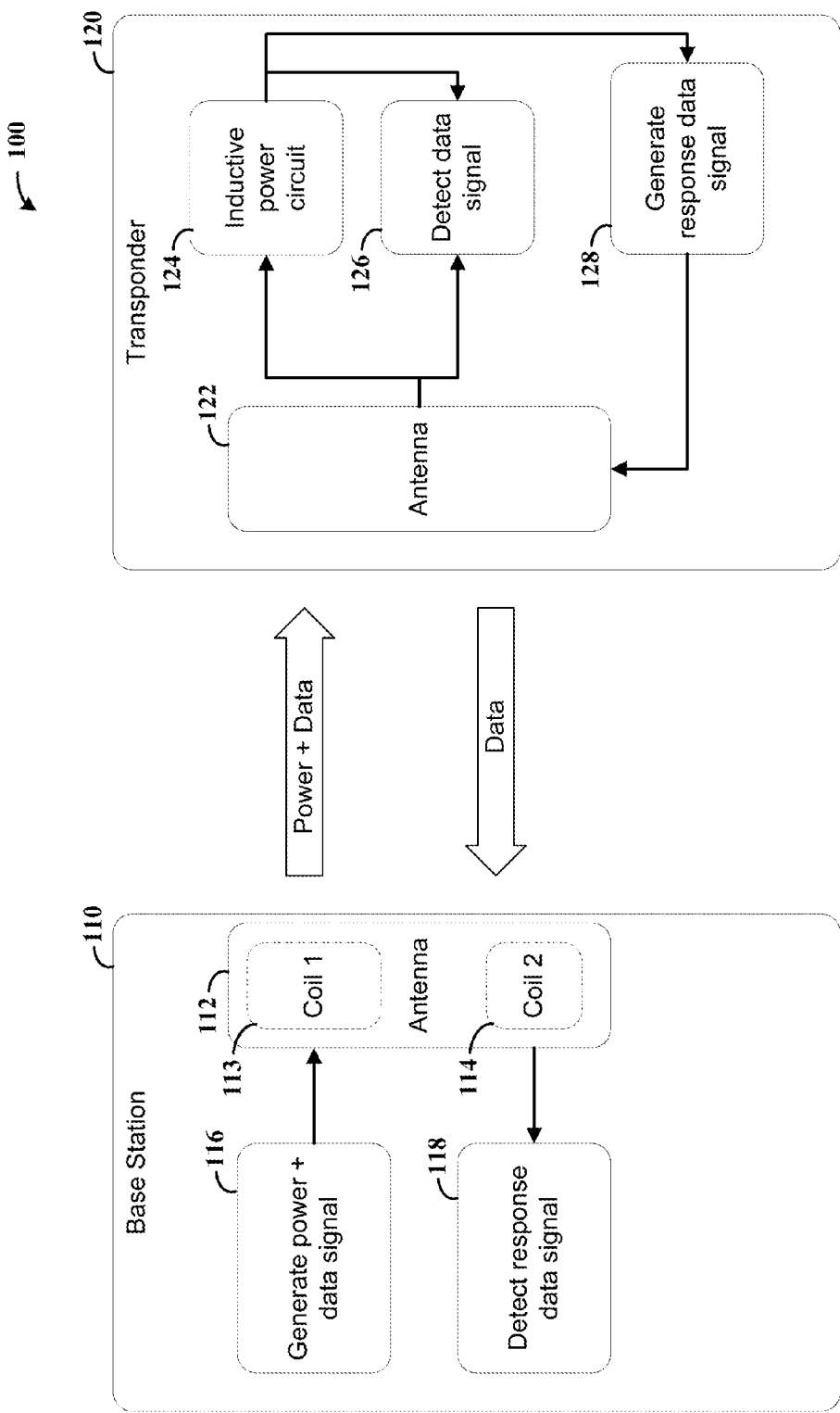
FIG. 1 shows an apparatus and wireless power/data communications, as may be implemented in accordance with one or more example embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure, including aspects defined in the claims. In addition, the term "example" as used throughout this application is only by way of illustration, and not limitation.

Aspects of the present disclosure are believed to be applicable to a variety of different types of apparatuses, systems and methods involving the wireless transmission of power and data. While not necessarily so limited, various aspects may be appreciated through a discussion of examples using this context.

Various embodiments are directed to communications between a base station and a transponder, in which the communications include both data for authenticating the communications and power for operating the transponder. Signal differentiation is used to mitigate the detection of noise presented via the communications, such as via those communications that power the transponder, while detecting data in the communications. Such an approach may, for example, be used in automotive applications in which the transponder is used to gain access to a vehicle housing the base station, via the authentication of the communications. Further, such embodiments are directed to methods, apparatuses and/or systems, which may include or employ one or more of the base station, the transponder, and circuits within one or more of the base station and transponder.

Signal differentiation is effected in one or more of a variety of manners, to suit particular applications. In some embodiments, separate transmitter and receiver antennas (inductors) are used at the base station, with the receiver antenna being tailored to differentiate signals via the receipt of a data signal from the transponder, relative to power/data communications transmitted to the transponder via the transmitter. In other embodiments, a dual-frequency communication approach is used differentiate signals transmitted from the base station to the transponder, from signals transmitted from the transponder to the base station. In still other embodiments, phase modulation is used in communicating data from the transponder to the base station (e.g., relative to load variation), to facilitate the detection of a phase-modulated signal that is differentiated from a (noise-including) signal transmitted from the base station to the transponder. In yet another embodiment, envelope variations in the base station transmitter are used to cancel the unwanted amplitude modulation from a carrier signal transmitted by the base station (e.g., the base station may subtract components of the signal transmitted to the transponder, from return signals received from the transponder). These and other approaches may be implemented together or separately, to suit various applications. For instance, such approaches can be used to differentiate a strong power/data signal from a relatively weak (transponder-generated) response signal (e.g., at a power ratio of 105 dB).

According to a more particular embodiment for use in communications between a base station and a transponder powered by the base station, a first radio frequency signal is communicated between the base station and the transponder to power the transponder. This first radio frequency signal includes noise and data for authenticating communications between the base station and the transponder. A second radio frequency signal is communicated between the base station and the transponder, and includes data for authenticating communications between the base station and the transponder. The detection of the noise presented via the first radio frequency signal (and/or the first radio signal itself) is mitigated, while detecting data in the second radio frequency signal by signal differentiation. Such signal differentiation may include, for example, one or more of: using different antennas to respectively transmit and receive signals, transmitting the first and second radio frequency signals at different frequencies, using one or more signal modulation schemes (e.g., amplitude of phase modulation), and using noise subtraction.

In some embodiments in which separate transmitter and receiver coils are used at the base station, the first radio frequency signal is communicated using a first antenna coil at the base station, and the second radio frequency signal is communicated (received) using a second antenna coil at the base station to mitigate detection of the noise presented via the first radio frequency signal. The first and second antenna coils are decoupled from one another, thereby differentiating the second radio frequency signal from the first radio frequency signal as received at the second antenna coil.

In other embodiments, the second radio frequency signal is communicated using a frequency that is different than a frequency used for communicating the first radio frequency signal, thereby differentiating the second radio frequency signal from the first radio frequency signal. For instance, by generating a carrier signal at the transponder having a frequency that is different than a carrier signal used by the base station (e.g., by modifying the received signal), a frequency-selective approach can be used to attenuate an unwanted (strong) transmitter signal and pass the wanted (weak) transponder signal on another frequency. In some implementations, the transponder generates the different carrier frequency signal, from the base station-generated signal, using a rational synthesizer. In a particular embodiment, a binary divider is used to generate a half-value carrier signal (e.g., to generate a 62.5 kHz carrier signal from a 125 kHz signal) for communications from the transponder to the base station. The transponder signal modulates using one or both of amplitude or phase modulation. The receiver at the base station has an input filter to pass the information channel frequency transmitted by the transponder, and the bandwidth of that channel due to the data modulation, and block or attenuate the transmitted carrier signal present on the same antenna inductor. In some implementations, a separate receiver coil, as discussed above, is used to receive the transponder signal and reduce the dynamic range at the base station receiver input.

Some embodiments involve detecting the second radio frequency signal at the base station using a frequency that is different than a frequency used for communicating the first radio frequency signal, which facilitates differentiation of the first radio frequency signal transmitted by the base station. Other embodiments involve generating the second radio frequency signal at the different frequency, at the transponder, such as by detuning the second radio frequency signal relative to the first radio frequency signal (e.g., as received and used to power the transponder). These approaches may be carried out using a single antenna coil at the base station to respectively transmit and detect the first and second radio frequency signals (at different frequencies), or using separate transmitter and receiver antennas to respectively transmit and detect the first and second radio frequency signals.

Some example embodiments directed to signal differentiation with the first and second signals using phase modulation operate as follows. The second radio frequency signal is modulated in phase to communicate data from the transponder to the base station, which uses the phase modulation to detect data therein and differentiate the data-carrying signal aspects from the first radio frequency signal (e.g., addressing one or both of large/small signal differences, and noise). This approach may, for example, include mitigating the detection of amplitude modulation-variation noise via the phase-modulation scheme in the second radio frequency signal, thereby differentiating the amplitude modulation-variation noise (and/or other aspects) of the first radio frequency signal.

Other embodiments are directed to subtracting a representation of the first radio frequency signal from the second radio frequency signal to produce a difference signal, and detecting the data in the second radio frequency signal in the difference signal. Such an approach may involve using a representation of the first radio frequency signal that includes, for example, one more of the actual signal itself, an estimated signal, a similarly-generated signal, or a look-up table.

Various embodiments are directed to communications between a base station and a key transponder, with the base station powered by a vehicle battery (e.g., a 12V automobile battery) and the key transponder powered by radio frequency (RF) communications from the base station, the communications facilitating access to and/or operating the vehicle. The communications from the base station to the key transponder employ amplitude shift keying, and the communications from the key transponder to base station employ amplitude modulation via load variation of loosely coupled inductors (e.g., similar to a loosely-coupled transformer with primary and secondary windings). Various system characteristics set available communication characteristics, such as distance between the base station and transponder. Generally, the power transmitted to the key is sufficient to supply the electronic circuit in the passive key transponder. Load variation in the key transponder is visible as amplitude variation or envelope variation in the base station, for communicating data. The receiver sensitivity facilitates reception of this (relatively weak) signal, which may be superimposed on a transmitted continuous wave of the base station. The purity of the base station transmitter can be tailored to facilitate detection of a returned signal to be stronger than unwanted noise on the continuous wave transmitted signal.

Another embodiment is directed to an apparatus including first and second antenna circuits in which the first antenna circuit transmits a first radio frequency signal from a base station to a transponder to power the transponder, and the second antenna circuit is decoupled from the first antenna circuit and receives a second radio frequency signal from the transponder. The first radio frequency signal includes noise and data for authenticating communications with the transponder, and the second radio frequency signal includes data for authenticating communications from the transponder. The decoupling facilitates differentiation of the second radio frequency signal from the first radio frequency signal, via the reception of less than the entire first radio frequency signal (and, e.g., signal and noise cancellation)

Another embodiment is directed to an apparatus that differentiates signals via phase modulation. The apparatus includes a communication circuit that communicates first and second radio frequency signals between a base station and a transponder, to power and communicate data with the transponder. The apparatus also includes a signal differentiation circuit that mitigates detection of noise presented in the communication of power and data to the transponder, based upon a modulation of a radio frequency signal communicated from the transponder, relative to the first radio frequency signal.

Another embodiment is directed to an apparatus that differentiates between respective signals via subtraction/cancellation of noise components. The apparatus includes a communication circuit that communicates a first radio frequency signal between a base station and a transponder to power the transponder, and a second radio frequency signal from the transponder. The first radio frequency signal includes noise and data for authenticating communications with the transponder, and the second radio frequency signal includes data for authenticating communications between the base station and the transponder. A signal differentiation circuit mitigates detection of the noise presented via the first radio frequency signal while detecting data in the second radio frequency signal, by subtracting a representation of the first radio frequency signal from the second radio frequency signal to produce a difference signal, and detecting the data in the second radio frequency signal in the difference signal. This subtraction may, for example, be effected as discussed herein.

Turning now to the Figures, FIG. 1 shows an apparatus 100 and wireless power/data communications, in accordance with one or more example embodiments. The apparatus 100 includes a base station 110 and a transponder 120 that is powered by the base station 110, with the base station and transponder communicating with one another to facilitate an authentication of the transponder. Some embodiments are directed to the base station 110 alone, other embodiments are directed to the transponder 120 alone, and still other embodiments are directed to the apparatus 100 as including both the base station and the transponder.

The base station 110 includes an antenna 112, a transmitter 116 that generates a signal carrying power and data, and a receiver 118 that detects/receives a response signal. The antenna 112 has a first coil 113, and an optional second coil 114. In some embodiments, the first coil 113 is used to both transmit and receive signals. In other embodiments, the first coil 113 transmits signals from the transmitter 116, and the second coil 114 receives signals that are presented to the receiver 118. In one or more of these embodiments, the second coil 114 is sized or tuned differently than the first coil 113, to facilitate signal differentiation via the detection of different signal types.

The transponder 120 includes an antenna 122, an inductive power circuit 124, a receiver 126 that detects data in received signals, and a transmitter 128 that generates and transmits a response signal via the antenna 122. The power circuit 124 provides power for operating the receiver 126 and transmitter 128, via the power and data signal from the transmitter 116.

Communications between the base station 110 and the transponder 120 are carried out using one or more of a variety of approaches, such as those described herein. The data communicated between the base station 110 and the transponder 120 is used to authenticate the transponder, via transmissions received at the receiver 118. In communicating the data, signal differentiation is used to mitigate the detection of noise presented via the communications, such as via RF communications transmitted by the base station 110 to power the transponder 120, while detecting data in the communications. In this context, signal differentiation may be implemented as discussed above using the second coil 114, via the use of different frequencies as implemented via transmission in the respective base station 110 and transponder 120, via phase modulation by the transmitter 128, or subtraction in the base station 110 (e.g., at the receiver 118) to remove undesirable noise aspects relating to the signal transmitted by the transmitter 116.

In various embodiments, the base station 110 and/or the transponder 120 use authentication circuits that use data in the respective signals for authentication. For instance, the transponder 120 may be programmed to respond to data from the base station based upon a comparison or other authentication of data received from the base station. Similarly, the base station 110 may be programmed to authenticate communications received from the transponder based upon a comparison or other authentication of data therein (e.g., by ensuring that the transponder communication includes a particular key or other type of data that can be used to verify that the transponder is intended for operation with the base station, such as for providing exclusive access to a vehicle). For general information regarding base stations, transponders, communications therebetween and authentication, and for specific information regarding methods, systems, base stations or transponders that may be implemented with one or more embodiments discussed herein, reference may be made to U.S. Patent Publication No. 2008/0024322 and U.S. patent application Ser. No. 13/046,194, which are fully incorporated herein by reference.

Figure 2:
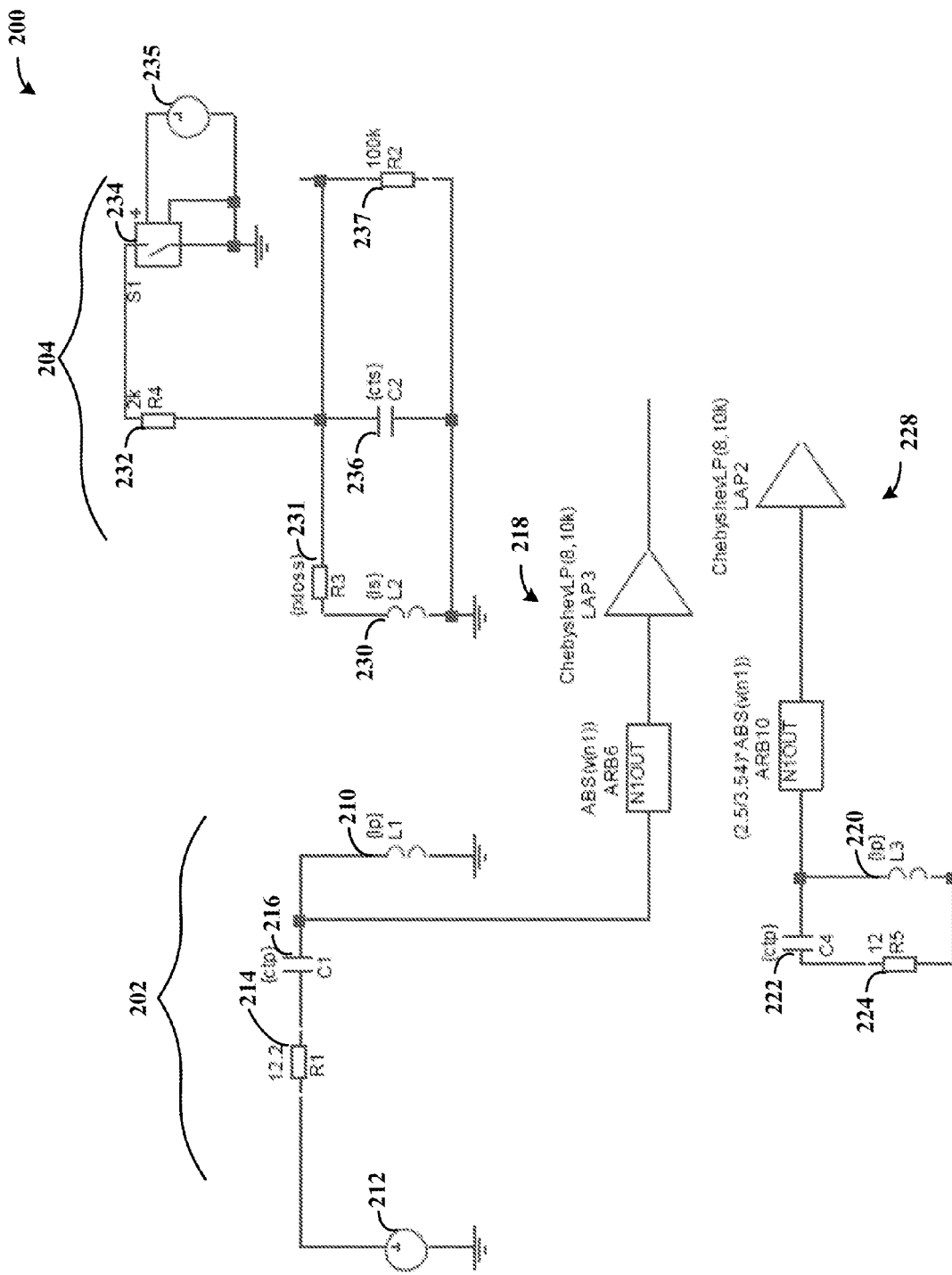
FIG. 2 shows an apparatus with separate transmit/receive antennas for wireless power/data communications, in accordance with another example embodiment.

FIG. 2 shows an apparatus 200 having a base station circuit 202 and transponder circuit 204, in which the base station includes separate transmit/receive antennas for wireless power and data communications, in accordance with another example embodiment. The apparatus 200 may, for example, be implemented using an approach similar to that shown in and/or described in connection with FIG. 1, with both the first and second coils 113 and 114.

The base station circuit 202 includes a transmitter circuit including a first coil 210, power source 212, resistor 214 and capacitor 216, as well as an output/filter circuit 218. The base station circuit also includes a receiver circuit including a second coil 220, capacitor 222, resistor 224 and an output/filter circuit 228. The transponder circuit 204 includes a coil 230, resistors 231 and 232 coupling the coil to a switch 234, for generating power at power source 235 using an RF signal received via the coil. The transponder also includes a capacitor 236 and resistor 237 connected across the coil 230, and for transmitting a response to the base station circuit 202. While the respective circuit components shown in FIG. 2 are provided with exemplary values and operative characteristics, these values are exemplary and may be implemented otherwise, to suit particular applications.

The separate coils 210 and 220 are configured relative to one another to differentiate signals received at coil 220 from signals transmitted at coil 210. The coil 220 is decoupled from the coil 210 with respect to at least some or most of the signals transmitted by coil 210, while maintaining coupling to the coil 230 in the transponder for receiving communications therefrom. Using this approach, unwanted sideband signals in the signal transmitted via coil 210 can be canceled/differentiated via the coil 220, which facilitates using transmissions from coil 210 with a relatively lower spectral purity. Moreover, the coil 220 can be implemented at a small size, relative to coil 210, via the decoupling and thus can be implemented in a smaller area.

Figure 3:
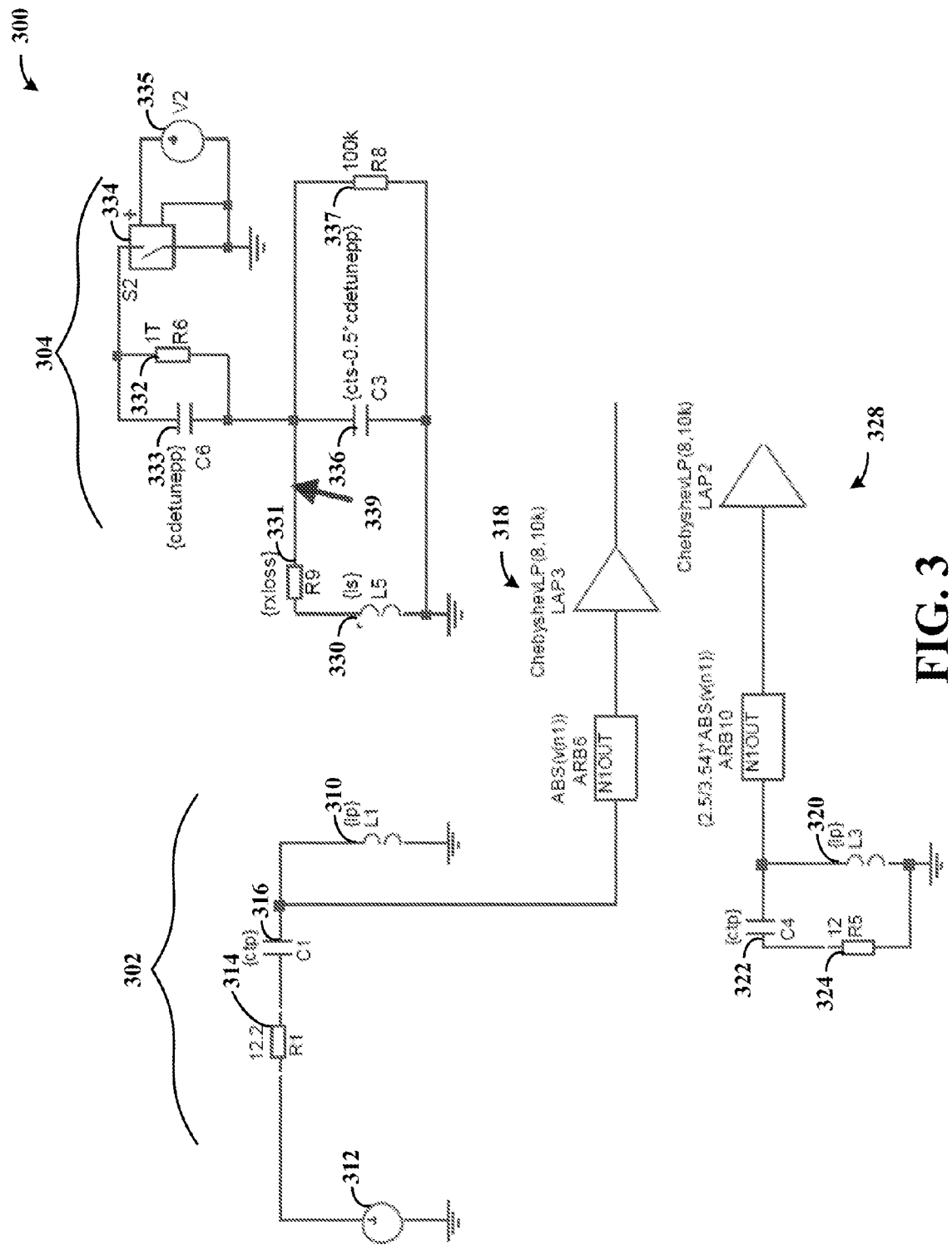
FIG. 3 shows an apparatus for wireless power/data communications with modulated/detuned transmission, in accordance with another example embodiment.

FIG. 3 shows an apparatus 300 for wireless power/data communications with modulated/detuned transmission, in accordance with another example embodiment. The apparatus 300 is similar to the apparatus 200 shown in FIG. 2, with similar components labeled similarly (e.g., base station circuit 302 is labeled similarly to base station circuit 202), and related discussion omitted for brevity. Further, as in FIG. 2, the values shown in the figure for the respective circuit components are exemplary, with the understanding that various embodiments employ similar approaches with circuits having differing characteristics (e.g., different inductance, resistance and capacitance values). Moreover, functionally similar circuits may be used to effect similar communications.

The apparatus 300 includes a transponder 304 having a capacitor 333 in parallel with resistor 332, and capacitor 336 that operates to detune signals transmitted from the transponder to the base station 320, relative to signals received from the base station. This detuning facilitates differentiation of the signal transmitted from the transponder 304 relative to the signal transmitted from the coil 310, in the signal as received at the base station circuit 302.

Specifically, the transponder circuit 304 employs load variation to return a signal with amplitude variation of the transmitted signal from the base station circuit 302, to give phase modulation and a shift of the zero crossing time moment of the carrier, independent from the actual amplitude of the transmitted carrier. Amplitude modulation and phase modulation can be demodulated independently, facilitating signal differentiation.

In some embodiments, phase modulation is obtained by detuning the resonance frequency of a resonance input circuit at the transponder 304. For instance, a plus and minus 45 degree phase variation can be implemented, with a zero degree reference phase obtained at resonance, by detuning to minus 3 dB amplitude frequencies. This phase modulates the signal returned to the base station, such that the receiver in the base station is sensitive in quadrature to the transmitted signal (e.g., and is not sensitive for amplitude variations in the transmitted signals from the base station), which mitigates the detection of spectral pollution of the base station coil 310. This approach facilitates the use of transmitters that may produce such pollution, while maintaining communication quality, such as by ensuring that the phase modulation purity of the transmitted carrier is adequate. Further, such an improved carrier to noise ratio facilitates the use of an unfiltered supply voltage for the power output stage of the base station circuit 320, which can also address manufacturing and cost issues.

Figure 4:
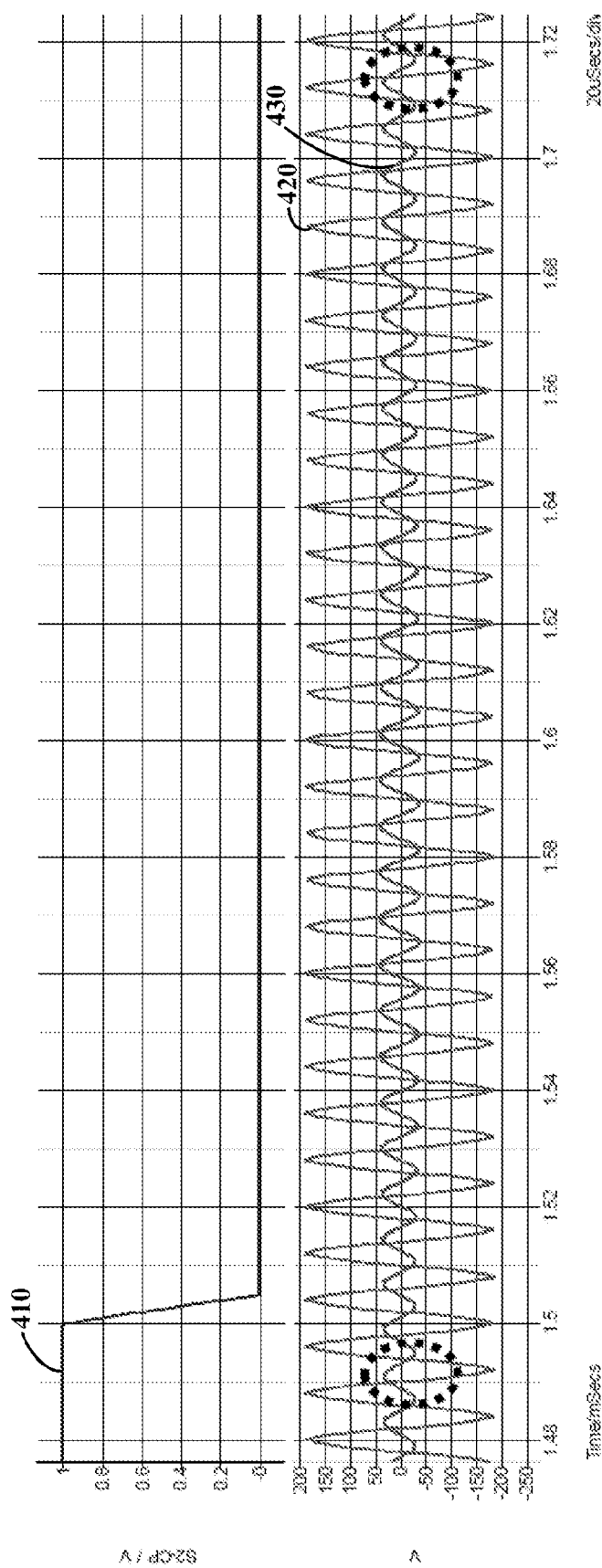
FIG. 4 shows a plot of signals for wireless power/data communications with modulated/detuned transmission, in accordance with another example embodiment.

FIG. 4 shows a plot of signals for wireless power/data communications with modulated/detuned transmission, in accordance with another example embodiment. The plot in FIG. 4 and related embodiments may be implemented using a circuit such as shown in and described in connection with FIG. 1 and/or 3. The plot 410 shows the activation of detuning in a transponder (e.g., 304 of FIG. 3), plot 420 is the voltage across the transmitter (e.g., 310 of FIG. 3) and is the reference phase, and plot 430 is the induced voltage in the transponder with phase modulation.

Using this approach, the supply voltage for the transponder is slightly lower as a result of the detuning from the resonance frequency, and interruptions in the supply power can be avoided. Further, this approach can be implemented without a large buffer capacitor for storing energy in the transponder, and facilitates rapid start-up times.

In some implementations, a receiver at the base station (e.g., 302 of FIG. 3) uses an input mixer after anti-alias filtering. The input mixer is based on a sample-hold structure that samples the signal near or at the zero crossings of the transmitted signal. This results in a low-DC-offset at the output of the sample hold. The wanted signal is superimposed on that potential DC signal at the output of the sample-hold detector. The timing for the sample-hold activation is obtained from the clock generation circuit of the base station transmitter.

Figure 5:
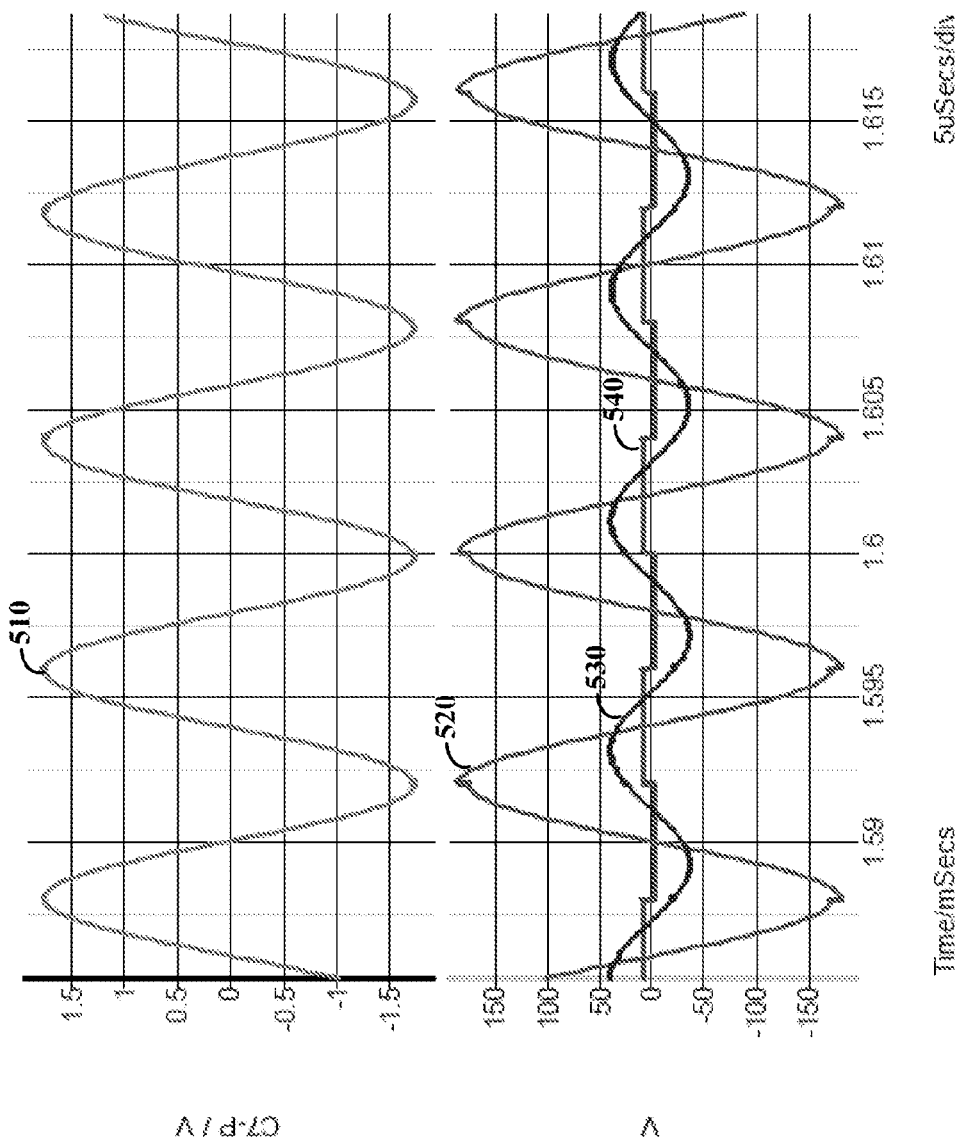
FIG. 5 shows another plot of signals for wireless power/data communications with modulated/detuned transmission, in accordance with another example embodiment.

FIG. 5 shows another plot of signals for wireless power/data communications with modulated/detuned transmission, in accordance with another example embodiment. Plot 510 corresponds to a signal at the receiver in a base station (e.g., presented at 320 in FIG. 3), plot 520 is the voltage across the base station transmitter coil (e.g., 310 in FIG. 3), plot 530 is the voltage in the key transponder (e.g., at 339 in FIG. 3), and plot 540 is the supply voltage (e.g., at 312 of FIG. 3. The voltage in a second coil of the base station is the result of partly-perfect cancellation, and can be aligned to be smaller.

The phase relation for the sample-hold activation can be derived from the square wave excitation. For amplitude shift keying (ASK), the moment is determined by the signal transition of the square wave. For phase modulation, the moment is shifted 90 degrees. The moment corresponds to the zero crossing of the transmitted signal voltage. Since the voltage plot contains the wanted signal, the time moment is derived from the original excitation signal. In some instances, the signal excitation in a binary divider makes a double frequency available (e.g., 250 kHz), and that signal contains the moment for activation of a sample-hold phase modulation detector as discussed above.

Figure 6:
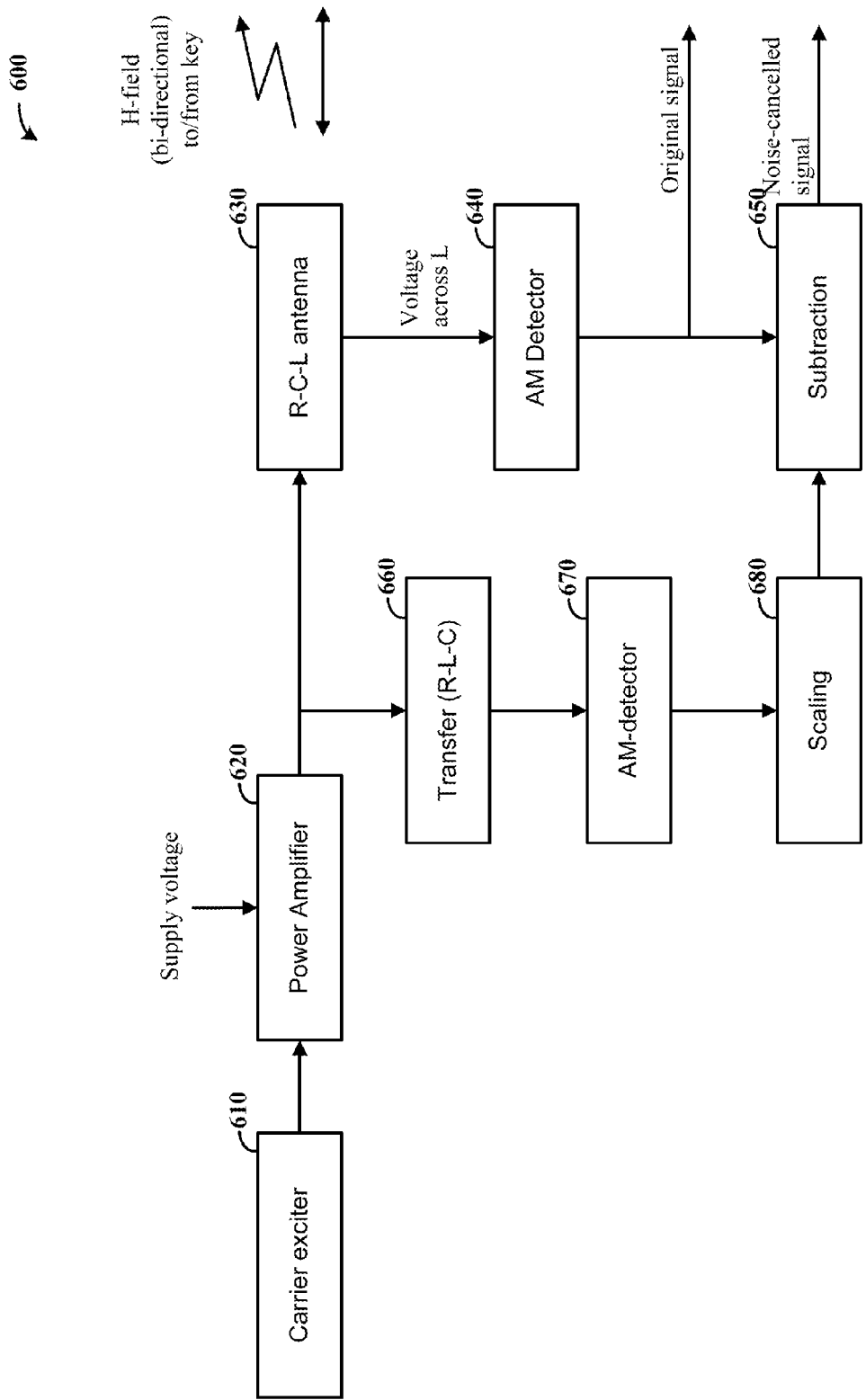
FIG. 6 shows an apparatus for wireless power/data communications with signal differentiation, in accordance with another example embodiment.

FIG. 6 shows an apparatus 600 for wireless power/data communications with signal differentiation, in accordance with another example embodiment. The apparatus 600 includes a carrier-exciter component 610, a power amplifier 620, and an R-C-L (resistor-capacitor-inductor) antenna 630, which transmit and receive signals with a remote transponder, and which power the remote transponder via the transmitted signals. The apparatus 600 also includes an amplitude modulation (AM) detector 640, coupled to receive signals from the remote transponder via the antennal 630, and that provides an output indicative of AM components of the received signals to a subtraction circuit 650. The apparatus 600 also includes a transfer R-L-C circuit 660, another AM detector 670, and a scaling circuit 680 that couple an output of the power amplifier 620 to the subtraction circuit 650, which uses that output along with that of the AM detector 640 to generate a noise-cancelled signal.

This subtraction circuit differentiates the data signal received from the transponder, from the carrier signal transmitted to the transponder, via cancellation of unwanted amplitude modulation in the carrier signal as indicated via circuits 660, 670 and 680. This approach is useful, for example, in differentiating AM-sidebands that result from noise in the output power amplifier 620, which cannot be distinguished from a wanted signal returned by the transponder. For example, the envelope variation can be measured across the transmitter inductor, which also contains the wanted signal from the transponder. The envelope variations are also present at the output of the power amplifier, and can be used in subtracting/differentiating the wanted signal. As such, envelope variations caused by the imperfections of the power amplifier and the supply voltage of the power amplifier can be estimated, measured, obtained from a lookup table, or otherwise characterized and used to subtract such variations in a signal including a wanted signal from a transponder. The transmitter signal can be demodulated before the resonance circuit, to construct a signal that contains the noise variation of the signal across the transmitter coil with or without the wanted received signal. As the wanted received signal from the key transponder is present in the transmitter inductor and the noise from the transmitter is present in both paths, the subtraction makes it possible to differentiate signals.

Various other circuitry can be used to achieve an effect similar to that shown in FIG. 6. For example, the transfer circuit 660 may be implemented with a wideband detector having matched low-pass post-detection transfer, similar to the transfer of an antenna resonator. Further, the (adaptive) scaling at 680 can be implemented as a manual preset, resulting in part of the noise cancellation. In some instances, an adaptive system automatically aligns the cancellation voltage ratio. The adaptation can be implemented during set-up of a transmission, when there is no data transmission that could interfere with an adaptive algorithm implemented at 680 (e.g., with variants for realization), such as via an adjustment of DC-voltages at the subtraction circuit 650, or with an adaptive loop, based on correlation measurement.

The circuitry and functions discussed herein, such as for signal differentiation and/or authentication, may be implemented using one or more of a variety of circuits. For instance, discrete logic circuits or programmable logic circuits may be configured and arranged for implementing these operations/activities, as shown in the Figures and described above. In certain embodiments, a programmable circuit includes one or more computer type circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Such circuits may, for example, communicate in an automotive type circuit for operating vehicle systems, such as for unlocking a door for vehicle entry or for activating a vehicle drive system component.

Based upon the above discussion and illustrations, those skilled in the art will readily recognize that various modifications and changes may be made to the various embodiments without strictly following the exemplary embodiments and applications illustrated and described herein. For example, one or more approaches as described herein may be implemented together, and those approaches described as being implemented together may also be implemented separately. Various methods, apparatus and systems may be implemented with a base station, transponder, or both a base station and a transponder. Circuitry and methods described in connection with a particular communication may thus be implemented with one or both of a transmission or reception of the communication. Such modifications do not depart from the true spirit and scope of various aspects of the invention, including aspects set forth in the claims.

What is claimed is:

1. For use in communications between a base station and a transponder powered by the base station, a method comprising:

communicating a first radio frequency signal from the base station to the transponder to power the transponder, the first radio frequency signal including power, noise and data for authenticating communications from the base station to the transponder;

communicating a second radio frequency signal from the transponder to the base station, the second radio frequency signal including data for authenticating communications from the transponder to the base station, wherein the data in the second radio frequency signal is responsive to the data in the first radio frequency signal;

mitigating an amount of the noise presented via the first radio frequency signal while detecting data set in the second radio frequency signal at the base station by signal differentiation of the second radio frequency signal from the transponder relative to the first radio frequency signal from the base station, wherein the signal differentiation includes:

sending the first radio frequency signal to the transponder using a first antenna at the base station and receiving the second radio frequency signal using a second antenna at the base station, wherein the first and the second antenna are decoupled relative to one another, the first antenna configured to transmit signals from the base station and the second antenna configured to receive signals at the base station, wherein the first and second radio frequency signals have different respective frequencies; and detecting, via the base station, the data in the second radio frequency signal using the signal differentiation, wherein communicating the second radio frequency signal includes communicating data via phase modulation in the second radio frequency signal, and mitigating the amount of the noise presented via the first radio frequency signal while detecting data in the second radio frequency signal includes mitigating an amount of amplitude modulation-variation noise via cancellation of amplitude modulation in a carrier signal on which the authentication data is communicated and detection of phase-modulation characteristics in the second radio frequency signal, thereby differentiating the second radio frequency signal from the first radio frequency signal.

2. The method of claim 1, wherein the second radio frequency signal is superimposed on a transmitted continuous wave of the base station and wherein mitigating the amount of the noise presented via the first radio frequency signal while detecting data in the second radio frequency signal includes differentiating the second radio frequency signal relative to the first radio frequency signal via at least one of, the first and second antennas at the base station to respectively transmit and receive signals, transmission of the first and second radio frequency signals at different frequencies, a signal modulation scheme and noise subtraction, wherein the first and second radio frequency signals are at different frequencies from one another at a value or rate which is independent of the power of the transmitted first radio frequency signal, and authenticating the transponder based upon the data for authenticating communications and the second radio frequency signal as detected at the base station.

3. The method of claim 1, wherein the base station is connected to circuitry in a vehicle having a battery and at least one of a passive keyless entry circuitry that unlocks a door to the vehicle and passive keyless go circuitry that activates a drive system for the vehicle, communicating the first radio frequency signal includes using the first antenna at the base station and power from the vehicle battery, and mitigating the amount of the noise presented via the first radio frequency signal includes using second antenna at the base station to receive the second radio frequency signal, the second antenna being decoupled from the first antenna, thereby differentiating the second radio frequency signal from the first radio frequency signal, authenticating the transponder based upon the data for authenticating communications and the second radio frequency signal as detected at the base station, and based on the authenticating, operating at least one of the passive keyless entry circuitry to unlock the door, and the passive keyless go circuitry to activate the drive system.

4. The method of claim 1, wherein a frequency of the second radio frequency signal includes a division of a frequency of the first radio frequency signal.

5. The method of claim 1, wherein mitigating the amount of the noise presented via the first radio frequency signal includes detecting the second radio frequency signal at the base station using a frequency that is different than a frequency used for communicating the first radio frequency signal from the base station to the transponder via the second antenna, wherein the first antenna is configured to transmit signals and not received signal and the second antenna is configured to receive signals and not transmit signals.

6. The method of claim 1, wherein mitigating the amount of the noise presented via the first radio frequency signal includes communicating the first radio frequency signal using a first antenna coil at the base station, and communicating the second radio frequency signal using a frequency that is different than a frequency used for communicating the first radio frequency signal, via a second antenna coil at the base station that is decoupled from the first antenna coil.

7. The method of claim 1, wherein mitigating the amount of the noise presented via the first radio frequency signal while detecting data in the second radio frequency signal includes subtracting a representation of the first radio frequency signal from the second radio frequency signal to produce a difference signal, and detecting the data in the second radio frequency signal in the difference signal.

8. The method of claim 1, wherein mitigating the amount of the noise presented via the first radio frequency signal while detecting data in the second radio frequency signal includes subtracting the first radio frequency signal from the second radio frequency signal to produce a difference signal, and detecting the data in the second radio frequency signal in the difference signal.

9. The method of claim 1, wherein mitigating the amount of the noise presented via the first radio frequency signal while detecting data in the second radio frequency signal includes subtracting a noise estimate of the first radio frequency signal from the second radio frequency signal to produce a difference signal, and detecting the data in the second radio frequency signal in the difference signal.

10. The method of claim 1, wherein a ratio of the power of the first radio frequency signal to the power of the second radio frequency signal is greater than about 105:1 dB.

11. The method of claim 1, wherein mitigating the amount of the noise presented via the first radio frequency signal while detecting data in the second radio frequency signal includes mitigating detection of the first radio frequency signal at the base station via the decoupling of the first antenna and the second antenna.

12. The method of claim 1, wherein communicating the second radio frequency signal between the base station and the transponder includes using the power provided via the first radio frequency signal to communicate the second radio frequency signal, and wherein the method further includes:

communicating the second radio frequency signal in response to authenticating the data in the first radio frequency signal received from the base station, wherein the authentication includes comparing the data in the first radio frequency signal to other data at the transponder;

authenticating the data in the second radio frequency signal received from the transponder by comparing the data in the second radio frequency signal to other data at the base station; and verifying the transponder is intended for operation with the base station in response to the authentication of the data in the second radio frequency signal.

13. An apparatus comprising:

a first circuit configured and arranged to communicate a first radio frequency signal from a base station to a transponder to power the transponder, the first radio frequency signal including power, noise and data for authenticating communications from the base station to the transponder;

a second circuit configured and arranged to communicate a second radio frequency signal from the transponder to the base station, the second radio frequency signal including data for authenticating communications from the transponder to the base station, wherein the data in the second radio frequency signal is responsive to the data in the first radio frequency signal, wherein the second circuit is further configured and arranged with the transponder to change a phase of the second radio frequency signal relative to the first radio frequency signal by modulating an amplitude such that the first and second radio frequency signals have different phases as transmitted, wherein the different phase of the second radio frequency signal is independent of an amplitude of a carrier portion of the first radio frequency signal; and a signal differentiation circuit configured and arranged to mitigate an amount of the noise presented via the first radio frequency signal while detecting data in the second radio frequency signal via signal differentiation of the second radio frequency relative to the first radio frequency signal, wherein the signal differentiation circuit is configured and arranged to detect the data in the second radio frequency signal via the signal differentiation, wherein the signal differentiation includes:

transmitting the first radio frequency signal by the base station at a first frequency; and transmitting the second radio frequency signal by the transponder at a second frequency that is different than the first frequency by a value or rate independent of the power of the first radio frequency signal.

14. The apparatus of claim 13, wherein the signal differentiation circuit is configured and arranged to authenticate the transponder based upon the data for authenticating communications and the second radio frequency signal as detected at the base station.

15. The apparatus of claim 13, wherein
the first and second circuits are an antenna circuit in the transponder that is configured and arranged to receive data and power signals from the base station and to transmit a data signal to the base station, and
the signal differentiation circuit is in the transponder and configured and arranged to mitigate the amount of the noise in received signal by modifying the second radio frequency signal relative to the first radio frequency signal by:
dividing a first frequency of the first radio frequency signal by a value or a rate that is independent of the power in the first radio frequency signal to generate the second frequency of the second radio frequency signal, and
transmitting the second radio frequency signal to the base station at the second frequency.

16. The apparatus of claim 13, wherein the signal differentiation circuit is configured and arranged to mitigate the amount of the noise presented via the first radio frequency signal while detecting data in the second radio frequency signal based upon respective frequencies of the first and second radio frequency signals.

17. The apparatus of claim 13, wherein the signal differentiation circuit is configured and arranged to mitigate the amount of the noise presented via the first radio frequency signal while detecting data in the second radio frequency signal by subtracting a representation of the first radio frequency signal from the second radio frequency signal to produce a difference signal, and detecting the data in the second radio frequency signal in the difference signal.

18. A system comprising:
a base station configured and arranged to communicate a first radio frequency signal including power, noise and data for authenticating communications from the base station to a transponder;
the transponder configured and arranged to receive the first radio frequency signal from the base station, and to use power in the first radio frequency signal to generate and transmit a second radio frequency signal including data for authenticating communications from the transponder to the base station, wherein the data in the second radio frequency signal is responsive to the data in the first radio frequency signal; and wherein the base station and the transponder are configured and arranged to mitigate an amount of the noise presented via the first radio frequency signal via signal differentiation of the second radio frequency relative to the first radio frequency signal, while communicating data in the second radio frequency signal to the base station, thereby authenticating the transponder by comparing the data for authenticating communications in the second radio frequency to other data associated with the base station, wherein the base station and transponder are configured and arranged to detect the data in the second radio frequency signal via the signal differentiation, wherein the signal differentiation includes:

the transponder further configured and arranged to change a phase of the second radio frequency signal relative to the first radio frequency signal by modulating an amplitude such that the first and second radio frequency signals have different phases as transmitted, wherein the different phase of the second radio frequency signal is independent of an amplitude of a carrier portion of the first radio frequency signal.

19. The system of claim 18, wherein the base station and the transponder are configured and arranged to mitigate the amount of the noise presented via the first radio frequency signal via signal based upon the modulation of the second radio frequency signal relative to the first radio frequency signal.

20. The system of claim 18, wherein the transponder is further configured and arranged to apply load variation to the second radio frequency signal with amplitude variation of the first radio frequency signal.

21. The system of claim 18, wherein the transponder is configured and arranged to change the phase of second radio frequency signal by phase modulating the second radio frequency signal relative to the first radio frequency signal with a shift of zero crossing time moment of the carrier portion, and being independent of the amplitude of the carrier portion of the transmitted first radio frequency signal.

22. The system of claim 18, wherein the transponder and base station are configured and arranged to mitigate the amount of the noise presented via the first radio frequency signal while detecting data in the second radio frequency signal by mitigating an amount of amplitude modulation-variation noise via cancellation of amplitude modulation in a carrier signal on which the authentication data is communicated and detection of phase-modulation characteristics in the second radio frequency signal, thereby differentiating the second radio frequency signal from the first radio frequency signal.

23. The system of claim 18, wherein the transponder is configured and arranged to detune a resonance frequency of a resonance input circuit at the transponder to change the phase.

24. The system of claim 18, wherein the transponder is configured and arranged to detune an amplitude frequency to result in a change of a degree phase variation with a zero degree reference phase.

25. An apparatus comprising:
a first antenna circuit at a base station configured and arranged to transmit a first radio frequency signal from base station to a transponder to power the transponder, the first radio frequency signal including power, noise and data for authenticating communications with the transponder; and
a second antenna circuit at the base station that is decoupled from the first antenna circuit and configured and arranged to:
receive a second radio frequency signal including data for authenticating communications from the transponder to the base station, wherein the second radio frequency signal is different than the first radio frequency signal and the data in the second radio frequency signal is responsive to the data in the first radio frequency signal,
to facilitate differentiation of the second radio frequency signal from the first radio frequency signal, and
mitigate an amount of noise in the first radio frequency signal via the decoupling of the second antenna circuit from the first antenna circuit, wherein the second antenna circuit is configured and arranged to detect the data in the second radio frequency signal via the signal differentiation, wherein the signal differentiation includes the first radio frequency signal and second radio frequency signal having different frequencies relative to one another and having different phases relative to one another due to an amplitude modulation carried out on at least one of the first radio frequency signal and the second radio frequency signal, and independent of the power of the first radio frequency signal.

26. The apparatus of claim 25, wherein the second antenna circuit is configured and arranged with a shape that is different from the first antenna circuit and that mitigates reception of at least some the first radio frequency signal, wherein the decoupling includes reception of less than the entire first radio frequency signal at the base station.

27. The apparatus of claim 25, wherein the second antenna circuit is configured and arranged to detect radio frequency signals having a frequency that is different than the frequency of the first radio frequency signal, to mitigate an amount of the first radio frequency signal, wherein a first frequency of the second radio frequency signal is different than a second frequency of the first radio frequency signal by a value or rate independent of the power of the first radio frequency signal.

28. An apparatus comprising:
a first circuit configured and arranged to communicate a first radio frequency signal from a base station to a transponder to power the transponder, the first radio frequency signal including power, noise and data for authenticating communications with the transponder from the base station; and
a second circuit configured and arranged to communicate a second radio frequency signal from the transponder to the base station, the second radio frequency signal including data for authenticating communications from the transponder to the base station, the second radio frequency signal having a frequency that is different than the first radio frequency signal and wherein the data in the second radio frequency signal is responsive to the data in the first radio frequency signal and the frequency of the second radio frequency signal is independent of the power of the first radio frequency signal; and
a signal differentiation circuit configured and arranged to mitigate an amount of the noise presented via the first radio frequency signal while detecting data in the second radio frequency signal, based upon the respective frequencies of the first and second radio frequency signals, wherein the signal differentiation circuit is configured and arranged to detect the data in the second radio frequency signal based on the respective frequencies, wherein the second circuit is configured and arranged to change a phase of second radio frequency signal by phase modulating the second radio frequency signal relative to the first radio frequency signal with a shift of zero crossing time moment of a carrier portion of the first radio frequency signal, and being independent of the amplitude of the carrier portion of the communicated first radio frequency signal.

29. The apparatus of claim 28, wherein the signal differentiation circuit is in the base station and coupled to the second circuit to receive the second radio frequency signal.

30. The apparatus of claim 28, wherein the signal differentiation circuit is in the transponder and configured and arranged to generate the second radio frequency signal at a frequency that is different than a frequency of the first radio frequency signal, and to communicate the second radio frequency signal to the base station via the second circuit, wherein the frequency of the second radio frequency signal includes a rate or division of the frequency of the first radio frequency signal.

31. The apparatus of claim 30, wherein the signal differentiation circuity includes a binary divider configured and arranged to generate the different frequency of the second radio frequency signal as a division of the frequency of the first radio frequency signal.

32. The apparatus of claim 30, wherein the signal differentiation circuity includes a binary divider configured and arranged to a half-carrier signal as the second radio frequency signal.

33. An apparatus comprising:
a communication circuit configured and arranged to:
communicate a first radio frequency signal from a base station to a transponder to power the transponder, the first radio frequency signal including power, noise and data for authenticating communications with the transponder from the base station, and
communicate a second radio frequency signal from the transponder to the base station, the second radio frequency signal including data for authenticating communications from the transponder to the base station, wherein the data in the second radio frequency signal is responsive to the data in the first radio frequency signal; and
a signal differentiation circuit configured and arranged to mitigate an amount of the noise presented via the first radio frequency signal while detecting data in the second radio frequency signal, based upon a modulation of the second radio frequency signal that includes an amplitude modulation, relative to the first radio frequency signal, wherein the signal differentiation circuit is configured and arranged to detect the data in the second radio frequency signal based on the modulation of the second radio frequency signal relative to the first radio frequency signal, wherein the signal differentiation includes the first radio frequency signal and second radio frequency signal having different phases, wherein the different phase of the second radio frequency signal is independent of an amplitude of a carrier portion of the first radio frequency signal.

34. The apparatus of claim 33, wherein the signal differentiation circuit is in the transponder and configured and arranged to mitigate the amount of the noise by generating the second radio frequency signal using phase modulation of the first radio frequency signal.

35. The apparatus of claim 33, wherein the signal differentiation circuit is in the transponder and configured and arranged to mitigate the amount of the noise by detuning a resonance frequency of the first signal received at the transponder.

36. The apparatus of claim 33, wherein the signal differentiation circuit is in the base station and sensitive in quadrature to the first radio frequency signal, thereby mitigating the amount of amplitude variations in the first radio frequency signal.

37. An apparatus comprising:
a communication circuit configured and arranged to
communicate a first radio frequency signal from a base station to a transponder to power the transponder, the first radio frequency signal including noise and data for authenticating communications with the transponder from the base station, and
communicate a second radio frequency signal from the transponder to the base station, the second radio frequency signal including data for authenticating communications from the transponder to the base station, wherein the second radio frequency signal is different than the first radio frequency signal and the data in the second radio frequency signal is responsive to the data in the first radio frequency signal; and
a signal differentiation circuit configured and arranged to mitigate an amount of the noise presented via the first radio frequency signal while detecting data in the second radio frequency signal, by subtracting a representation of the first radio frequency signal from the second radio frequency signal to produce a difference signal, and detecting the data in the second radio frequency signal in the difference signal, wherein the signal differentiation includes:
measuring envelope variations across an transmitter inductor of the base station resulting from the first radio frequency signal and the second radio frequency signal, and
subtracting the envelope variations from another to produce the difference signal.

38. The apparatus of claim 37, wherein the signal differentiation circuit is configured and arranged to produce the difference signal by demodulating the first radio frequency signal.

39. The apparatus of claim 37, wherein the signal differentiation circuit includes
a first circuit configured and arranged to produce the representation of the first radio frequency signal that includes the noise,
a second circuit configured and arranged to provide the second radio frequency signal including a representation of the noise and data from the transponder, and
a subtraction circuit configured and arranged to subtract the representation of the first radio frequency signal from the second radio frequency signal to provide an output indicative of the data from the transponder.

40. The apparatus of claim 37, wherein noise is present the envelope variations of the first and second radio frequency signals, and the signal differentiation circuit is configured and arranged to produce the different signal by:
subtracting the envelope variations resulting from the first radio frequency signal from the envelope variations resulting from the second radio frequency signal to provide difference signal that is indicative of the data from the transponder.

\* \* \* \* \*